(12) United States Patent  
Komiyama

(10) Patent No.: US 9,560,306 B2  
(45) Date of Patent: Jan. 31, 2017

(54) DISPLAY APPARATUS FOR DETERMINING A FORMAT OF AN ANALOG VIDEO SIGNAL

(71) Applicant: CANON KABUSHIKI KAISHA, Tokyo (JP)

(72) Inventor: Tomoaki Komiyama, Kamakura (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/594,962

(22) Filed: Jan. 12, 2015

(65) Prior Publication Data

US 2015/0201151 A1 Jul. 16, 2015

(30) Foreign Application Priority Data

Jan. 16, 2014 (JP) ................................. 2014-006271

(51) Int. Cl.
```
H04N 5/46      (2006.01)
G09G 3/00      (2006.01)
H04N 7/01      (2006.01)
```
(52) U.S. Cl.  
CPC .................. H04N 5/46 (2013.01); G09G 3/00 (2013.01); H04N 7/01 (2013.01)

(58) Field of Classification Search  
CPC .... H04N 1/0402; H04N 21/4355; H04N 5/46; H04N 7/01  
USPC ........................................................ 348/556  
See application file for complete search history.

(56) References Cited

U.S. PATENT DOCUMENTS

| 6,043,803 | A | 3/2000 | Shimizu | |
| 6,252,590 | B1* | 6/2001 | Sawai | G06F 3/14 345/667 |
| 6,504,533 | B1 | 1/2003 | Murayama | |
| 7,136,098 | B1* | 11/2006 | Burnett | H04N 5/2256 348/230.1 |
| 8,502,919 | B2 | 8/2013 | Kimura | |
| 8,817,109 | B1* | 8/2014 | Biagiotti | G09G 5/006 348/181 |
| 2002/0027614 | A1* | 3/2002 | Konuma | H04N 7/0122 348/558 |
| 2004/0156076 | A1* | 8/2004 | Togami | H04N 1/46 358/2.1 |
| 2006/0061687 | A1* | 3/2006 | Dunton | H04N 5/44513 348/564 |
| 2008/0316361 | A1 | 12/2008 | Ito | |
| 2009/0079870 | A1* | 3/2009 | Matsui | G09G 5/008 348/558 |
| 2009/0122159 | A1* | 5/2009 | Sakaue | H04N 5/23293 348/231.99 |

(Continued)

FOREIGN PATENT DOCUMENTS

| CN | 1564121 A | 1/2005 |
| CN | 101329857 A | 12/2008 |

(Continued)

*Primary Examiner* — Michael Lee  
(74) *Attorney, Agent, or Firm* — Canon USA, Inc. I.P. Division

(57) ABSTRACT

A display apparatus includes a measuring unit that measures an effective image area of an input analog video signal, and a determining unit that determines whether or not a candidate format is a format of the input analog video signal based on information relating to the measured effective image area and information relating to an effective image area of the candidate format.

11 Claims, 9 Drawing Sheets

(56) References Cited

U.S. PATENT DOCUMENTS

| | | | |
|---|---|---|---|
| 2009/0196389 A1* | 8/2009 | Yamashita | G09G 5/008 375/362 |
| 2009/0295781 A1* | 12/2009 | Funada | G09G 5/005 345/213 |
| 2011/0299605 A1* | 12/2011 | Price | H04N 19/85 375/240.26 |
| 2012/0188448 A1 | 7/2012 | Kimura | |
| 2013/0207999 A1* | 8/2013 | Hagiwara | G06F 17/30274 345/619 |

FOREIGN PATENT DOCUMENTS

| | | |
|---|---|---|
| CN | 102549642 A | 7/2012 |
| JP | H10-091127 A | 4/1998 |
| JP | 2000-305555 A | 11/2000 |

\* cited by examiner

FIG. 3

| FMT_NAME | hSync Freq [KHz] | hResol [Pixel] | hResol TIME [msec] | hSw [Pixel] | hBp [Pixel] | hFp [Pixel] | hSw +hBp TIME [msec] | vSync Freq [Hz] | vResol [Line] | vSw [Line] | vBp [Line] | vFp [Line] | vTotal [Line] | SAMPLING CLOCK [MHz] |
|---|---|---|---|---|---|---|---|---|---|---|---|---|---|---|
| 1280x1024_A | 63.668 | 1280 | 11.74 | 136 | 216 | 80 | 2.72 | 59.895 | 1024 | 7 | 29 | 3 | 1063 | 109 |
| 1280x1024_B | 63.352 | 1280 | 11.48 | 200 | 252 | 28 | 2.51 | 59.936 | 1024 | 3 | 26 | 4 | 1057 | 111.5 |
| 1280x1024_C | 63.194 | 1280 | 14.07 | 32 | 80 | 48 | 1.41 | 59.957 | 1024 | 7 | 20 | 3 | 1054 | 91 |
| 1280x1024_D | 63.737 | 1280 | 11.69 | 156 | 238 | 44 | 2.58 | 60.016 | 1024 | 3 | 32 | 3 | 1062 | 109.5 |
| 1280x1024_E | 63.378 | 1280 | 11.82 | 184 | 200 | 44 | 2.25 | 60.017 | 1024 | 3 | 26 | 3 | 1056 | 108.25 |
| 1280x1024_F | 63.827 | 1280 | 11.82 | 114 | 252 | 50 | 2.79 | 60.214 | 1024 | 4 | 27 | 5 | 1060 | 108.25 |

FIG. 5A

| FMT_NAME | hStart [msec] | hEnd [msec] | vStart [Line] | vEnd [Line] |
|---|---|---|---|---|
| 1280×1024_B | 4.05 | 15.53 | 29 | 1053 |
| 1280×1024_C | 1.23 | 15.30 | 27 | 1051 |
| 1280×1024_E | 3.55 | 15.37 | 29 | 1053 |

| FMT_NAME | hStart_diff [msec] | hEnd_diff [msec] | vStart_diff [Line] | vEnd_diff [Line] |
|---|---|---|---|---|
| 1280×1024_B | +0.5 | +0.16 | 0 | 0 |
| 1280×1024_C | −2.32 | −0.07 | −2 | −2 |
| 1280×1024_E | 0 | 0 | 0 | 0 |

511, 512, 513, 514

DISPLAY APPARATUS FOR DETERMINING A FORMAT OF AN ANALOG VIDEO SIGNAL

BACKGROUND

Field of the Invention

The present invention relates to a display apparatus that is capable of determining a format or a type of an analog video signal.

Description of the Related Art

There is known an image display apparatus that is provided with an analog video input terminal and that supports types of analog video signals having different horizontal synchronous frequencies/vertical synchronous frequencies. Such an image display apparatus determines a characteristic value (e.g., a horizontal synchronous frequency, a vertical synchronous frequency, a horizontal resolution, and a vertical resolution) of an input analog video signal, and converts the input analog video signal to a digital signal at a sampling frequency in accordance with the determination result. Japanese Patent Laid-Open No. 10-91127 describes a video signal determining technique for determining the most appropriate format by comparing a characteristic value of a video signal stored in a memory with a characteristic value of an input analog video signal.

As there is an increasing variety of analog video signals, it is becoming difficult to differentiate among analog video signals only by a vertical resolution, a horizontal resolution, or a vertical frequency. Among video signals of 1280 pixels×1024 lines (60 Hz), for example, there are video signals that have the same vertical resolution and the same horizontal resolution but have different blanking periods or different quantization clock timings. In a case in which video signals differ only in terms of their blanking periods or quantization clock frequencies, it is difficult to appropriately estimate video formats through the technique described in Japanese Patent Laid-Open No. 10-91127. When the video formats are estimated incorrectly, a deviation in the angle of view, a missing view angle, or an image disturbance may occur.

SUMMARY

According to an aspect of the present invention, there are provided a display apparatus and a method that can determine a format or a type of an input analog video signal.

According to another aspect of the present invention, there is provided a display apparatus comprising: a measuring unit that measures an effective image area of an input analog video signal; and a determining unit that determines whether or not a candidate format is a format of the input analog video signal based on information relating to the measured effective image area and information relating to an effective image area of the candidate format.

According to another aspect of the present invention, there is provided a method comprising: measuring an effective image area of an input analog video signal; and determining whether or not a candidate format is a format of the input analog video signal based on information relating to the measured effective image area and information relating to an effective image area of the candidate format.

Further features and aspects of the present invention will become apparent from the following description of exemplary embodiments.

BRIEF DESCRIPTION OF THE DRAWINGS

FIG. 3 is an illustration for describing an exemplary structure and contents of a format table.

FIG. 5A is a table for illustrating examples of a start time hStart, a start line vStart, an end time hEnd, and an end line vEnd for each candidate format. FIG. 5B is a table for illustrating examples of differential values between measured values of an input analog video signal and the start time hStart, the start line vStart, the end time hEnd, and the end line vEnd for each candidate formats.

DESCRIPTION OF THE EMBODIMENTS

Exemplary embodiments, features, and aspects of the present invention will be described below with reference to the drawings.

First Exemplary Embodiment

Figure 1:
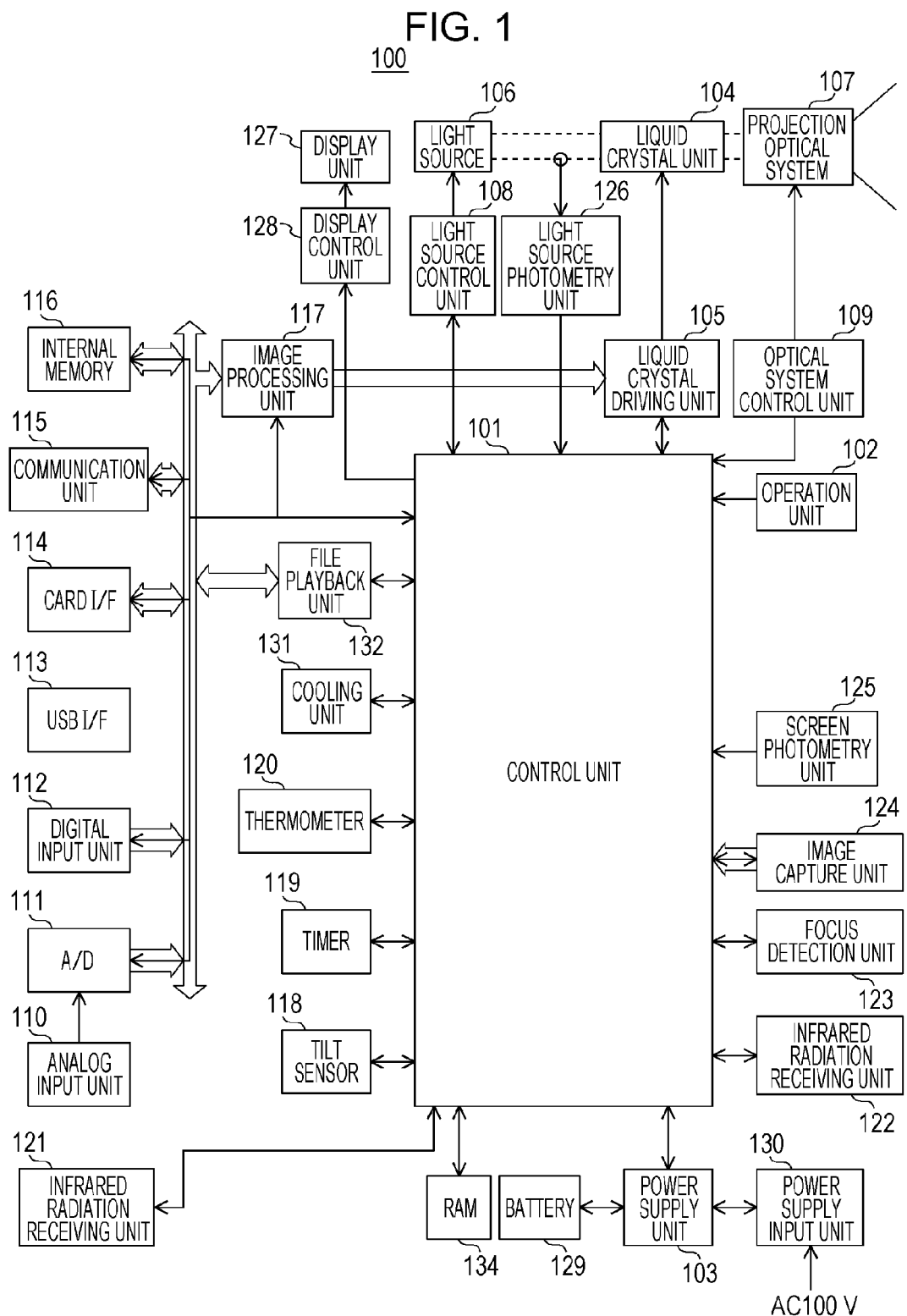
FIG. 1 is a block diagram illustrating a schematic configuration of a projector 100 serving as an example of a display apparatus according to a first exemplary embodiment.

FIG. 1 is a block diagram illustrating a schematic configuration of a projector 100 serving as an example of a display apparatus according to a first exemplary embodiment. The projector 100 acts as a video signal determining apparatus, and includes a liquid crystal display device. The display apparatus according to the first exemplary embodiment is not limited to the projector 100, and may be a display apparatus different from the projector 100.

A control unit 101 controls each block in the projector 100. An operation unit 102 receives user operations. A power supply unit 103 controls power supplying to each block in the projector 100.

A liquid crystal unit 104 is configured by one or three liquid crystal panel(s) and so forth, and the liquid crystal unit 104 forms an image on the liquid crystal panel(s). A liquid crystal driving unit 105 causes an image to be formed on a liquid crystal panel of the liquid crystal unit 104 in accordance with an input image signal. A light source 106 illuminates the liquid crystal unit 104 from a rear side of the liquid crystal unit 104. A projection optical system 107 projects, on a screen, an optical image obtained by supplying illumination light from the light source 106 to the liquid crystal unit 104. A light source control unit 108 controls a quantity of light and so forth of the light source 106. An optical system control unit 109 controls operations of a zoom lens, a focusing lens, and so forth included in the projection optical system 107 so as to perform a zoom magnification, a focus adjustment, and so forth.

An analog input unit 110 receives an analog video signal from a video source, such as a PC (personal computer), a DVD player, a television tuner, and the analog input unit 110 includes an RGB terminal, an S terminal, and so forth. An A/D conversion unit 111 converts an analog video signal from the analog input unit 110 to a digital signal. In addition to carrying out the A/D conversion, the A/D conversion unit 111 can use to measure a timing and a polarity of an analog video signal inputted from the analog input unit 110. The A/D conversion can set various conditions relating to an A/D conversion process, and carries out an A/D conversion in accordance with the set conditions. Although there are various A/D conversion methods including a double integral method in which an analog input voltage is integrated for a set period of time, a parallel comparison method in which a comparator is used, and a sequential comparison method in which a comparison is made against a D/A conversion value, there is no limitation as to which method is to be employed.

A digital input unit 112 receives a digital video signal from a video source, and includes an HDMI (High-Definition Multimedia Interface) terminal and so forth. In a case of the HDMI terminal, a control signal may also be transmitted simultaneously with a digital video signal from the outside, and an image display control or the like may be performed by the control signal. A video signal and an image signal inputted from the digital input unit 112 are directly transmitted to an image processing unit 117.

A Universal Serial Bus (USB) interface 113 can receive files, such as video data, image data, and a video file, from an external apparatus, and can also write such files into an external apparatus. The USB interface 113 may have a pointing device, a keyboard, a USB flash memory, and so forth connected thereto.

A card interface 114 reads and writes files, such as video data, image data, and a video file, from and into a card type recording medium. A communication unit 115 transmits and receives files, such as video data, image data, and a video file, and other instruction signals through an intranet or the Internet. The communication unit 115 is configured, for example, by a wired LAN, a wireless LAN, or the like.

An internal memory 116 stores files, such as video data, image data, and a video file, and is configured by a storage unit, such as a semiconductor memory and a hard disk. The internal memory 116 stores a format table. The format table contains various format information or characteristic information of types of analog video signals which the projector 100 can support, and sampling clock frequencies to be employed for the A/D conversion. An exemplary structure and contents of the table are illustrated in FIG. 3. The format information includes, for example, information that defines a horizontal synchronous frequency, a vertical synchronous frequency, a total number of pixels per line, a total number of lines in an effective image area, and a position and size of the effective image area.

A document file that has been inputted through the card interface 114, for example, is played back by a file playback unit 132. The file playback unit 132 generates, from the document file, an image signal for displaying an image to a user, and outputs the generated image signal to the image processing unit 117.

The image processing unit 117 analyzes image signals obtained from the USB interface 113, the card interface 114, and the file playback unit 132, a video signal obtained from the control unit 101, and so forth so as to make a correction appropriate for display in the liquid crystal unit 104. The image processing unit 117, for example, changes a total number of pixels in an image signal so as to match a total number of pixels in a liquid crystal panel, and doubles a total number of frames in an inputted video signal for the AC driving of the liquid crystal panel; thus, the image processing unit 117 makes a correction appropriate for forming an image on the liquid crystal panel. Here, in the AC driving of the liquid crystal panel, an image is displayed on the liquid crystal panel while the direction of a voltage applied to the liquid crystal of the liquid crystal panel is switched in an alternating manner, and this method utilizes characteristics of a liquid crystal panel in which an image can be formed regardless of whether the voltage is applied to the liquid crystal in a forward direction or in a reverse direction. In this case, an image for the forward direction and an image for the reverse direction need to be transmitted to the liquid crystal driving unit 105, and thus the image processing unit 117 carries out a process of doubling a total number of frames in the video signal. The liquid crystal driving unit 105 causes an image to be formed on the liquid crystal panel in the liquid crystal unit 104 in accordance with an image signal from the image processing unit 117.

The image processing unit 117 can measure or analyze various parameters of a digital video signal outputted from the A/D conversion unit 111. For example, some analog video signals inputted to the analog input unit 110 from the outside do not include a DE (Data Enable) signal that indicates a display start position. The image processing unit 117 determines a display start position and so forth based on a horizontal synchronization signal, a vertical synchronization signal, and an input analog video signal, and the control unit 101 controls an image processing in the image processing unit 117 and an A/D conversion in the A/D conversion unit 111 based on the result of the determination of the image processing unit 117.

In addition, in a case in which an image is projected on a screen at an angle relative to the screen and the projected image is distorted in a trapezoidal shape, for example, the image processing unit 117 carries out a keystone correction on the projected image to change a shape of the image so as to cancel out a trapezoidal distortion. When a keystone correction is to be made, an enlargement/reduction ratio of the image displayed on the liquid crystal panel is changed in a horizontal direction and/or a vertical direction. In other words, the trapezoidal distortion of the projected image is canceled out by the distortion of an image area on the liquid crystal panel. Through this, the projected image is displayed on the screen in a state close to a rectangular image display area having a normal aspect ratio. The keystone correction may be carried out automatically based on a tilt angle obtained by a tilt sensor 118, or may be carried out by a user operating the operation unit 102.

The tilt sensor 118 detects a tilt of the projector 100. A timer 119 detects an operation time of the projector 100, an operation time of each block in the projector 100, and so forth. A thermometer 120 measures a temperature of the light source 106 in the projector 100, a temperature of the liquid crystal unit 104, an ambient temperature, and so forth.

Infrared radiation receiving units 121 and 122 receive infrared radiation from a remote controller for the projector 100 or from other devices, and transmit the received signals to the control unit 101. The infrared radiation receiving units 121 and 122 are disposed in a front part, a rear part, or the like of the projector 100. In the first exemplary embodiment, the infrared radiation receiving unit 121 is disposed in a rear part of the projector 100, and the infrared radiation receiving unit 122 is disposed in a front part of the projector 100.

A focus detection unit 123 detects a distance between the projector 100 and a screen, and detects a focal distance. An image capture unit 124 captures an image in a direction toward the screen. A screen photometry unit 125 measures a quantity or luminance of light reflected by the screen. A light source photometry unit 126 measures a quantity or luminance of light emitted from the light source 106.

A display unit 127 is disposed in the main body of the projector 100, and displays a status of the projector 100, a warning, and so forth. A display control unit 128 controls the display unit 127.

A battery 129 supplies electric power to the projector 100 when the projector 100, for example, is carried around and is used. A power supply input unit 130 receives AC electric power from the outside, rectifies the AC electric power to a predetermined voltage, and supplies the predetermined voltage to the power supply unit 103.

A cooling unit 131 cools the projector 100 by releasing heat from the projector 100 to the outside, and is configured, for example, by a heat sink and a fan.

A RAM (random access memory) 134 is used to extract a program stored in the internal memory 116, and is also used as a frame memory or the like of a projected image.

The basic operation of the projector 100 will now be described. The control unit 101 of the projector 100 controls the power supply unit 103, in response to an instruction from the operation unit 102 for turning on the power, so that the power supply unit 103 supplies power to each block in the projector 100, and puts each block in a standby state. After the power supply is turned on, the control unit 101 instructs the light source control unit 108 to cause the light source 106 to emit light. The control unit 101 then instructs the optical system control unit 109 to adjust a focus of the projection optical system 107 based on focus distance information and so forth obtained from the focus detection unit 123. The control unit 101 instructs the optical system control unit 109 to operate a zoom lens or focusing lens of the projection optical system 107 so that projected light is imaged on the screen. The adjustment of the focus will be described later in detail. Through the above-described operation, the projector 100 becomes ready for projection.

A video signal inputted to the digital input unit 112 is converted, by the image processing unit 117, to a signal having a resolution appropriate for the liquid crystal unit 104, and the obtained signal is then subjected to a gamma correction, a correction for suppressing uneven luminance, and a keystone correction. The liquid crystal driving unit 105 causes the liquid crystal panel of the liquid crystal unit 104 to form an image in accordance with the video signal that has been corrected by the image processing unit 117. The image formed on the liquid crystal panel of the liquid crystal unit 104 is optically modulated by an illumination light from the light source 106, and is converted into an optical image. This optical image is projected on the screen by the projection optical system 107.

While the optical image is being projected, the control unit 101 detects a temperature of the light source 106 and so forth with the thermometer 120, and operates the cooling unit 131 when, for example, the temperature of the light source 106 reaches or exceeds 40° C. so as to cool the light source 106.

When the operation unit 102 is operated so as to turn off the power, the control unit 101 instructs each block in the projector 100 to carry out a termination process. Upon the projector 100 becoming ready to be terminated, the power supply unit 103 successively stops supplying power to the blocks in the projector 100. The cooling unit 131 operates for a certain period of time after the power is turned off so as to cool the projector 100.

Although an operation carried out in a case in which a video signal inputted from the digital input unit 112 is displayed has been described, a similar operation is carried out even in a case in which image data inputted from the USB interface 113 or the card interface 114 is to be displayed.

Figure 2:
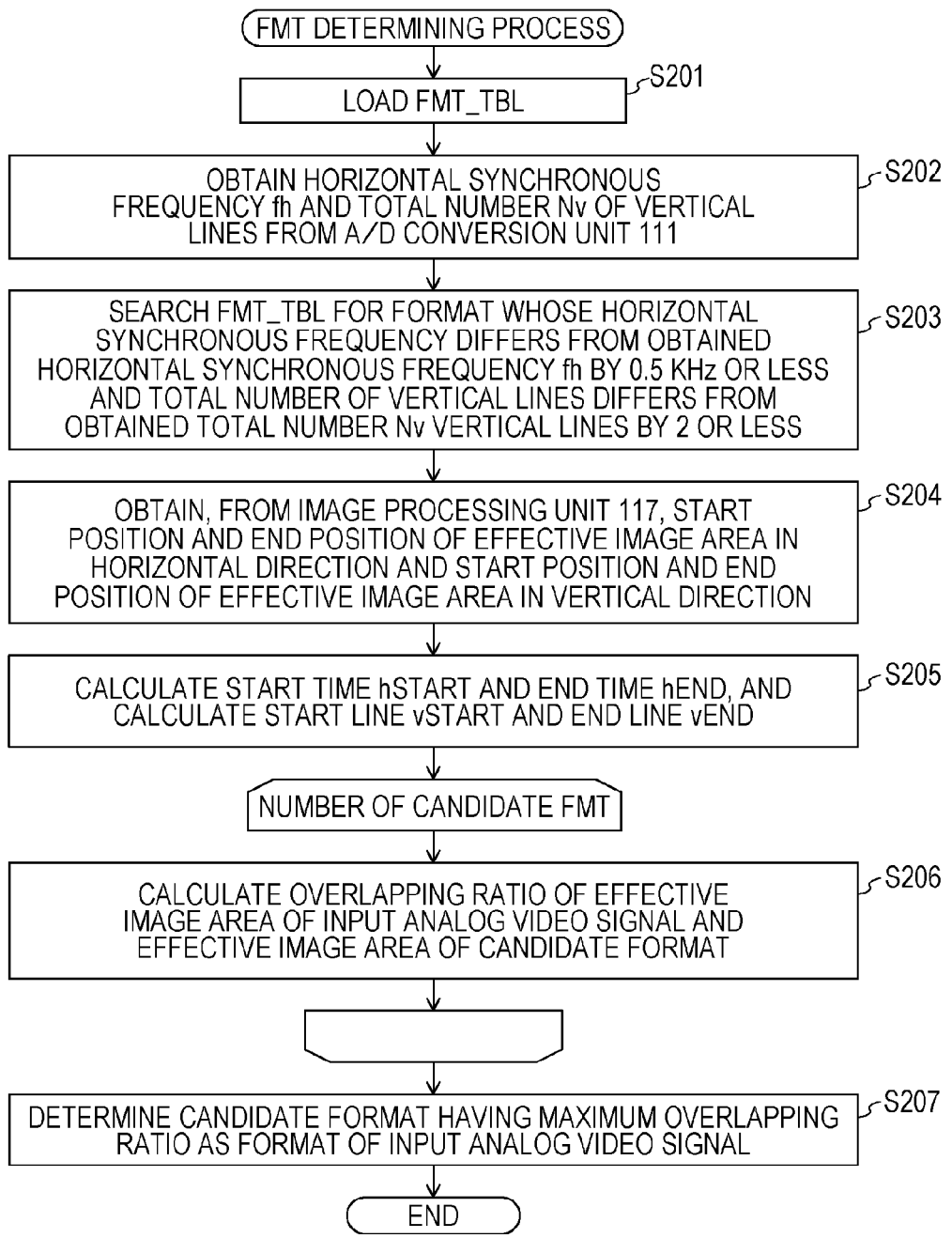
FIG. 2 is a flowchart for illustrating a format determining process according to the first exemplary embodiment.

Referring to FIGS. 2 through 5B, a format determining process (FMT determining process) carried out in the first exemplary embodiment will be described. The FMT determining process is carried out to determine a format or type of an analog video signal inputted to the analog input unit 110. FIG. 2 is a flowchart for illustrating the FMT determining process according to the first exemplary embodiment. FIG. 3 is an illustration for describing an exemplary structure and contents of a format table (FMT table). As an example in the first exemplary embodiment, a case in which a format name of an analog video signal inputted to the analog input unit 110 is 1280×1024_E shown in FIG. 3 will be described.

The projector 100 starts the FMT determining process illustrated in FIG. 2, upon detecting an input of an analog video signal to the analog input unit 110. For example, when the A/D conversion unit 111 detects a synchronization signal of an input signal from the analog input unit 110, the A/D conversion unit 111 notifies the control unit 101 of such detection by an interrupt. Alternatively, the control unit 101 may determine whether a synchronization signal has been inputted to the A/D conversion unit 111 by polling the A/D conversion unit 111. As a trigger for starting the FMT determining process, a change in a format or type of an analog video signal being inputted to the analog input unit 110 or other conditions may be employed.

Upon receiving, from the A/D conversion unit 111, a notification indicating that an analog video signal has been inputted, the control unit 101 starts the FMT determining process illustrated in FIG. 2.

In step S201, the control unit 101 reads out information (FMT_TBL) corresponding to the FMT table that is stored in the internal memory 116, and then loads the information on the RAM 134.

In step S202, the control unit 101 accesses the A/D conversion unit 111 so as to obtain information indicating a horizontal synchronous frequency fh and a total number Nv of vertical lines through a bus, and then loads the information on the RAM 134.

In step S203, the control unit 101 searches information (FMT_TBL) corresponding to the FMT table stored in the RAM 134 for a format whose horizontal synchronous frequency and total number of vertical lines are close to those obtained from the A/D conversion unit 111, and sets that format as a candidate format. In the example in the first exemplary embodiment, the control unit 101 searches for a format whose horizontal synchronous frequency differs from the horizontal synchronous frequency fh obtained in step S202 by 0.5 KHz or less and total number of vertical lines differs from the total number Nv of vertical lines obtained in step S202 by 2 or less.

For example, in a case where a format name of an analog video signal is 1280×1024_E, a horizontal synchronous frequency and a total number of vertical lines of the analog video signal are, respectively, 63.378 KHz and 1056 as illustrated in FIG. 3 (refer to columns 301 and 313 in FIG.

3). Formats whose horizontal synchronous frequency differs from a horizontal synchronous frequency of 1280×1024_E by 0.5 KHz or less are 1280×1024_A, 1280×1024_B, 1280×1024_C, 1280×1024_D, 1280×1024_E, and 1280×1024_F. Formats whose total number of vertical lines differs from a total number of vertical lines of 1280×1024_E by 2 or less are 1280×1024_B, 1280×1024_C, and 1280×1024_E. Therefore, formats that meet both conditions are 1280×1024_B, 1280×1024_C, and 1280×1024_E.

In FIG. 3, a column (FMT_NAME) to the left of the column 301 indicates a format name. The column 301 (hSync Freq) indicates a horizontal synchronous frequency (KHz). A column 302 (hResol) indicates a total number of pixels (Pixel) corresponding to a length of an effective image area in a horizontal direction, and a column 303 (hResol Time) indicates a time (msec) corresponding to the length of the effective image area in the horizontal direction. A column 304 (hSw) indicates a total number of pixels (Pixel) corresponding to a width of a horizontal synchronization signal. A column 305 (hBp) indicates a total number of pixels (Pixel) corresponding to a horizontal back porch, and a column 306 (hFp) indicates a total number of pixels (Pixel) corresponding to a horizontal front porch. A column 307 (hSw+hBp Time) indicates a time (msec) corresponding to the sum of the total number of pixels corresponding to the width of the horizontal synchronization signal and the total number of pixels corresponding to the horizontal back porch. A column 308 (vSync Freq) indicates a vertical synchronous frequency (Hz). A column 309 (vResol) indicates a total number of lines (Line) corresponding to a length of the effective image area in a vertical direction. A column 310 (vSw) indicates a total number of lines (Line) corresponding to a width of a vertical synchronization signal. A column 311 (vBp) indicates a total number of lines (Line) corresponding to a vertical back porch, and a column 312 (vFp) indicates a total number of lines (Line) corresponding to a vertical front porch. The column 313 (vTotal) indicates a total number of vertical lines (Line). A column 314 (Sampling Clock) indicates a sampling clock frequency (MHz).

Thus, in the example of the first exemplary embodiment, in step S203, the control unit 101 searches the information (FMT_TBL) corresponding to the FMT table for 1280×1024_B, 1280×1024_C, and 1280×1024_E. The control unit 101 sets, in the A/D conversion unit 111, a sampling clock frequency that is the highest frequency among sampling clock frequencies that are corresponding to formats found by searching the information (FMT_TBL) corresponding to the FMT table. Through this, the accuracy in a measurement of time and total number of lines by the image processing unit 117 in step S204 can be improved. Alternatively, the control unit 101 may set, in the A/D conversion unit 111, a sampling clock frequency that is at the upper limit of a resolution of the A/D conversion unit 111.

In step S204, based on the sampling clock frequency set in the A/D conversion unit 111, the image processing unit 117 measures a time from a horizontal synchronization signal to a start position of an effective image area of the input analog video signal in a horizontal direction, a time from the horizontal synchronization signal to an end position of the effective image area of the input analog video signal in the horizontal direction, a total number of lines from a vertical synchronization signal to a start position of the effective image area of the input analog video signal in a vertical direction, and a total number of lines from the vertical synchronization signal to an end position of the effective image area of the input analog video signal in the vertical direction. Here, a leading edge of the horizontal synchronization signal is designated as the start position for measuring a time, and a leading edge of the vertical synchronization signal is designated as the start position for measuring a total number of lines. The image processing unit 117 notifies the control unit 101 of the four measurement results.

Figure 4:
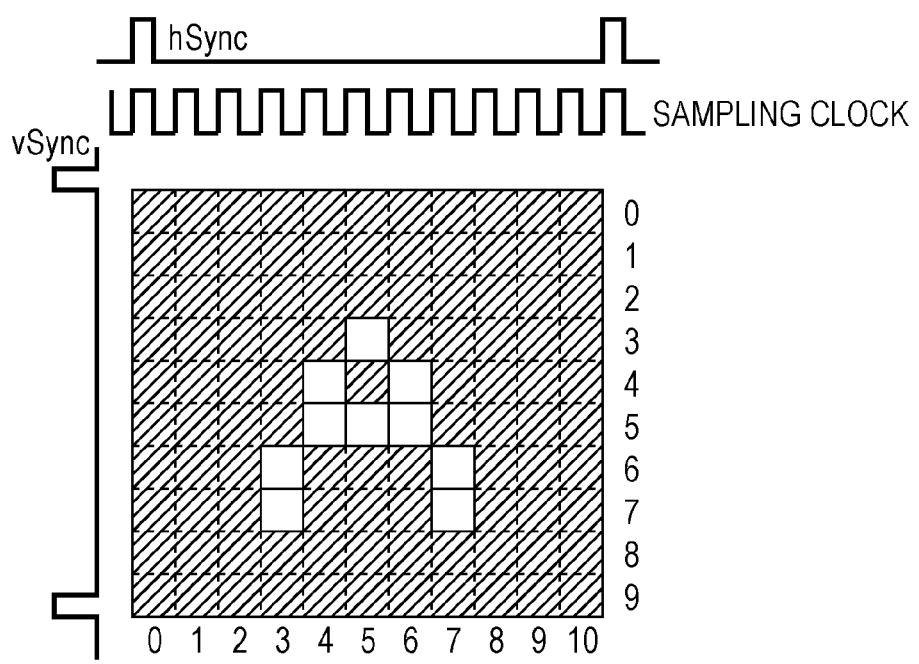
FIG. 4 is an illustration for describing an exemplary structure of a video signal within a frame.

Referring to FIG. 4, a method for measuring the start position and the end position of the effective image area of the input analog video signal in the horizontal direction and the start position and the end position of the effective image area of the input analog video signal in the vertical direction will be described. FIG. 4 illustrates an example of a video signal of 7 (Pixels)×7 (Lines). Solid white pixels correspond to pixels for displaying an image, and the remaining hatched pixels indicate the reference level, or in other words, indicate black. The image processing unit 117, for example, detects an input of a pixel other than black from video data (e.g., any of R, G, and B) outputted from the A/D conversion unit 111. In other words, in a case where the range of A/D conversion is from 0 through 255, the image processing unit 117, for example, detects an input of a pixel that has a value other than 0 from video data (e.g., any of R, G, and B) outputted from the A/D conversion unit 111.

More specifically, after the image processing unit 117 detects an input of vertical synchronization signal (vSync) and an input of horizontal synchronization signal (hSync), the image processing unit 117 starts counting a total number of inputs of sampling clocks and a total number of inputs of horizontal synchronization signals. Then, in order to detect the effective image area of the input analog video signal, the image processing unit 117 measures an amplitude value of the video data outputted from the A/D conversion unit 111 at an input timing of the sampling clock frequency. After the effective image area is detected, the image processing unit 117 determines a start position and an end position of the first line of the effective image area and a start position and an end position of the last line of the effective image area. Through this, the image processing unit 117 obtains, as determination results, a total number of inputs of sampling clocks that corresponds to the start position of the first line of the effective image area, a total number of inputs of sampling clocks that corresponds to the end position of the first line of the effective image area, a total number of inputs of horizontal synchronization signals that corresponds to the start position of the first line of the effective image area, and a total number of inputs of horizontal synchronization signals that corresponds to the start position of the last line of the effective image area. The image processing unit 117 stores these measurements results in an internal register of the image processing unit 117.

Thereafter, the image processing unit 117 repeats the measurement of the start position and the end position of the first line of the effective image area and the measurement of the start position and the end position of the last line of the effective image area for each time an input of vertical synchronization signal is detected.

In a case where the image processing unit 117 receives a subsequent vertical synchronization signal, the image processing unit 117 stores, in the internal register as the start position of the effective image area in the horizontal direction, the total number of inputs of sampling clocks that corresponds to the start position of the first line of the effective image area. In this case, the image processing unit 117 also stores, in the internal register as the end position of the effective image area in the horizontal direction, the total number of inputs of sampling clocks that corresponds to the end position of the first line of the effective image area. In this case, the image processing unit 117 also stores, in the internal register as the start position of the effective image area in the vertical direction, the total number of inputs of horizontal synchronization signals that corresponds to the start position of the first line of the effective image area. In this case, the image processing unit 117 also stores, in the internal register as the end position of the effective image area in the vertical direction, the total number of inputs of horizontal synchronization signals that corresponds to the start position of the last line of the effective image area.

By carrying out such an operation each time a vertical synchronization signal is inputted, the image processing unit 117 can detect the start positions and the end positions of the effective image area in the horizontal direction and in the vertical direction in each frame image included in the input analog video signal.

In a case of the video signal illustrated in FIG. 4, concerning the horizontal direction, the image processing unit 117 stores, in the internal register, information indicating that the start position of the effective image area in the horizontal direction falls on the third pixel and the end position of the effective image area in the horizontal direction falls on the seventh pixel. Concerning the vertical direction, the image processing unit 117 stores, in the internal register, information indicating that the start position of the effective image area in the vertical direction falls on the third line and the end position of the effective image area in the vertical direction falls on the seventh line. Alternatively, the start position and the end position of the effective image area in the horizontal direction and the start position and the end position of the effective image area in the vertical direction may each be converted to a time based on the sampling clock frequency.

On the supposition that the sampling clock frequency which the control unit 101 has set in the A/D conversion unit 111 is 100 MHz, in the example illustrated in FIG. 4, since the start position of the effective image area in the horizontal direction falls on the third pixel, the start position in the horizontal direction falls at the position or the timing that is 30 ns past the horizontal synchronization signal. In a similar manner, the end position in the horizontal direction is calculated to fall at the position or the timing that is 70 ns past the horizontal synchronization signal.

In step S205, the control unit 101 calculates a start time hStart and an end time hEnd in accordance with the sampling clock frequency set in the A/D conversion unit 111. Here, the start time hStart corresponds to a time between the horizontal synchronization signal and the start position of the effective image area in the horizontal direction. The end time hEnd corresponds to a time between the horizontal synchronization signal and the end position of the effective image area in the horizontal direction. In a similar manner, the control unit 101 calculates a start line vStart and an end line vEnd in accordance with the sampling clock frequency set in the A/D conversion unit 111. Here, the start line vStart corresponds to a total number of lines included within the vertical synchronization signal and the start position of the effective image area in the vertical direction. The end line vEnd corresponds to a total number of lines included within the vertical synchronization signal and the end position of the effective image area in the vertical direction.

FIG. 5A illustrates the start time hStart, the end time hEnd, the start line vStart, and the end line vEnd of each one of three candidate formats (namely, 1280×1024_B, 1280× 1024_C, and 1280×1024_E) found in step S203. In FIG. 5A, a column (FMT_NAME) to the left of a column 501 indicates the format name. The column 501 indicates the start time hStart (msec) of the effective image area in the horizontal direction, and a column 502 indicates the end time hEnd (msec) of the effective image area in the horizontal direction. A column 503 indicates the start line vStart (Line) of the effective image area in the vertical direction, and a column 504 indicates the end line vEnd (Line) of the effective image area in the vertical direction.

In the example in the first exemplary embodiment, an analog video signal whose format name is 1280×1024_E has been inputted to the analog input unit 110. Thus, based on the calculation result in step S205, the control unit 101 obtains the start time hStart, the start line vStart, the end time hEnd, and the end line vEnd that are the same as those of the candidate format whose format name is 1280×1024_E (refer to FIG. 5A). The effective image area of the input analog video signal is then defined based on the start time hStart, the start line vStart, the end time hEnd, and the end line vEnd that are calculated in step S205.

In step S206, the control unit 101 calculates an overlapping ratio of the effective image area of the input analog video signal and the effective image area of at least one candidate format found in step S203.

FIG. 5B is a table illustrating differential values between the calculation results obtained in step S205 and the start time hStart, the start line vStart, the end time hEnd, and the end line vEnd of each one of candidate formats found in step S203. Since an analog video signal whose file name is 1280×1024_E has been inputted to the analog input unit 110, differential values between the calculation results obtained in step S205 and the start time hStart, the start line vStart, the end time hEnd, and the end line vEnd of the input analog video signal become 0. In FIG. 5B, a column (FMT_NAME) to the left of a column 511 indicates the format name. The column 511 indicates a differential value hStart_diff (msec) between the start time hStart calculated in step S205 and the start time hStart of each candidate format, and a column 512 indicates a differential value hEnd_diff (msec) between the end time hEnd calculated in step S205 and the end time hEnd of each candidate format. A column 513 indicates a differential value vStart_diff (Line) between the start line vStart calculated in step S205 and the start line vStart of each candidate format, and a column 514 indicates a differential value vEnd_diff (Line) between the end line vEnd calculated in step S205 and the end line vEnd of each candidate format.

Figure 6A:
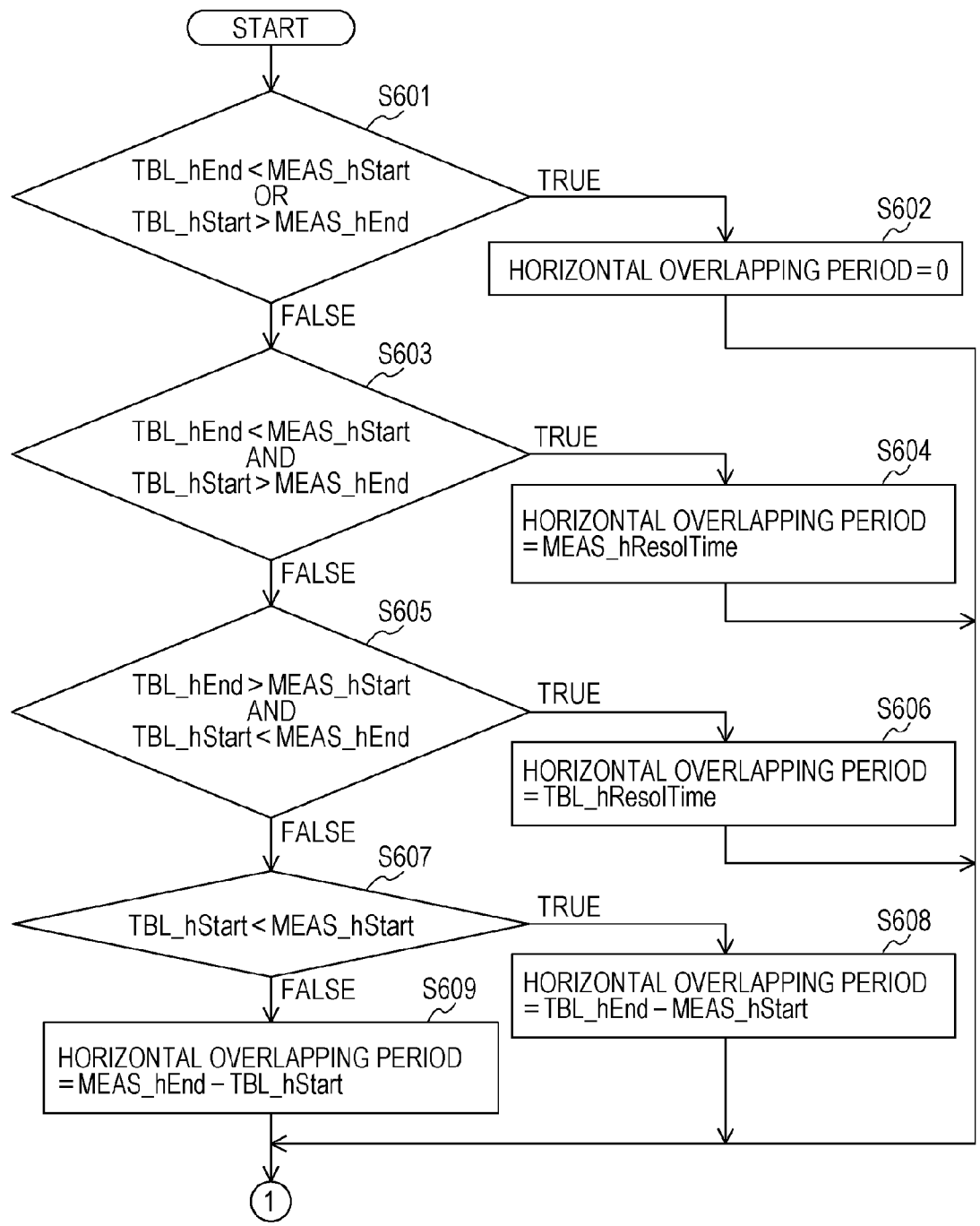
FIG. 6A is a flowchart for illustrating a process of calculating an overlapping ratio of an effective image area of an input analog video signal and an effective image area of a candidate format.
Figure 6B:
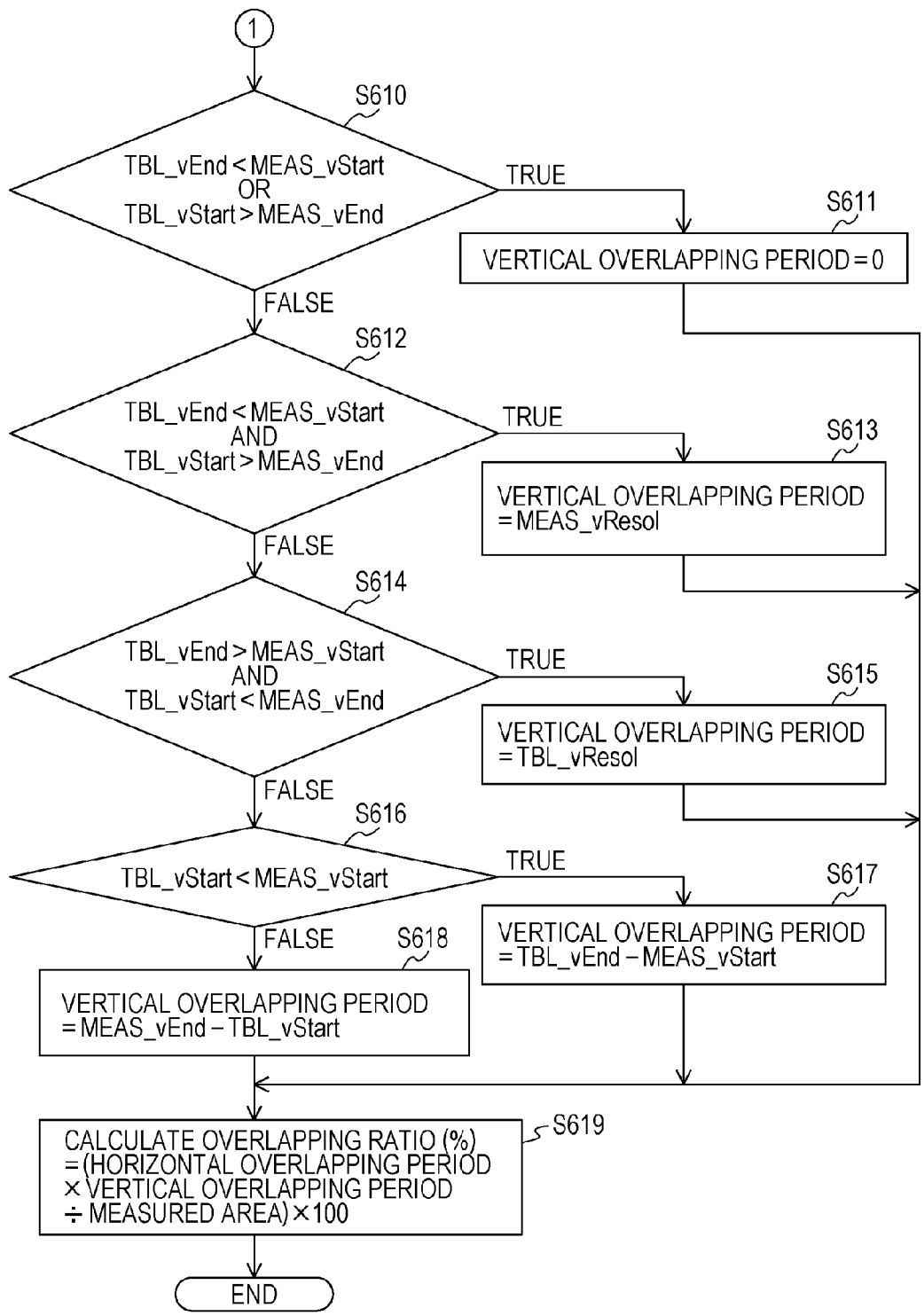
FIG. 6B is a flowchart for illustrating the process of calculating the overlapping ratio of the effective image area of the input analog video signal and the effective image area of the candidate format.
Figure 7:
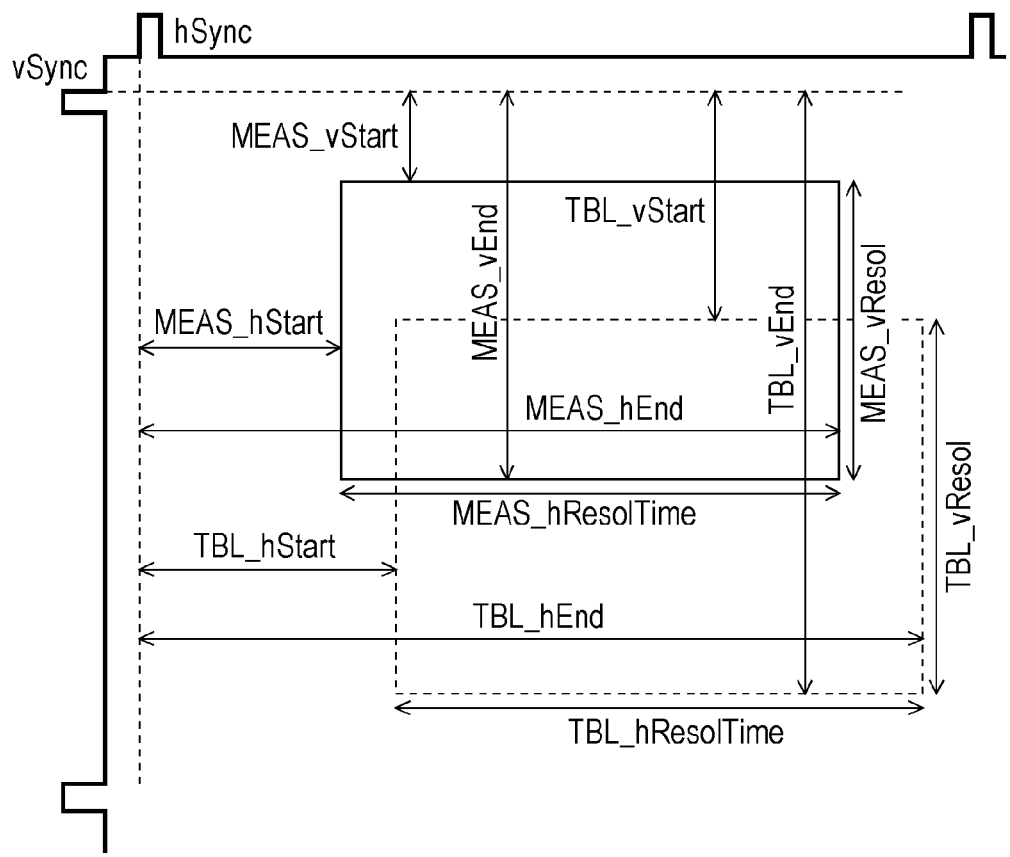
FIG. 7 is an illustration for describing relationships between parameters that represent an effective image area of an input analog video signal and parameters that represent an effective image area of a candidate format.

FIGS. 6A and 6B illustrate a flowchart for illustrating a process of calculating an overlapping ratio of the effective image area of the input analog video signal and the effective image area of the candidate format. FIG. 7 is an illustration for describing relationships between parameters that represent the effective image area of the input analog video signal and parameters that represent the effective image area of the candidate format. In FIG. 7, the effective image area of the input analog video signal is indicated by solid lines, and the effective image area of the candidate format is indicated by broken lines. MEAS_hStart indicates the start position (measured value) of the effective image area of the input analog video signal in the horizontal direction, and MEAS_hEnd indicates the end position (measured value) of the effective image area of the input analog video signal in the horizontal direction. MEAS_vStart indicates the start position (measured value) of the effective image area of the input analog video signal in the vertical direction, and MEAS_vEnd indicates the end position (measured value) of the effective image area of the input analog video signal in the vertical direction. MEAS_hStart, MEAS_hEnd, MEAS- _vStart, and MEAS_vEnd are calculated by the control unit 101 in step S205. TBL_hStart indicates the start position of the effective image area of the candidate format in the horizontal direction, and TBL_hEnd indicates the end position of the effective image area of the candidate format in the horizontal direction. TBL_vStart indicates the start position of the effective image area of the candidate format in the vertical direction, and TBL_vEnd indicates the end position of the effective image area of the candidate format in the vertical direction. The control unit 101 calculates TBL_hStart, TBL_hEnd, TBL_vStart, and TBL_vEnd based on the information (FMT_TBL) corresponding to the FMT table stored in the internal memory 116.

A horizontal period MEAS_hResolTime of the effective image area measured in step S204 can be obtained by subtracting MEAS_hStart from MEAS_hEnd. A vertical period (or a total number of lines) MEAS_vResol of the effective image area measured in step S204 can be obtained by subtracting MEAS_vStart from MEAS_vEnd. A horizontal period TBL_hResolTime of the effective image area of the candidate format can be obtained by subtracting TBL_hStart from TBL_hEnd. A vertical period (or a total number of lines) TBL_vResol of the effective image area of the candidate format can be obtained by subtracting TBL_vStart from TBL_vEnd. The horizontal period MEAS_hResolTime, the vertical period MEAS_vResol, the horizontal period TBL_hResolTime, and the vertical period TBL_vResol are calculated by the control unit 101.

FIGS. 8A through 8D are illustrations for describing exemplary cases in which the effective image area of the input analog video signal and the effective image area of the candidate format are overlapped with each other. Solid lines indicate the effective image area measured in step S204, and broken lines indicate the effective image area of the candidate format.

Referring to FIGS. 6A and 6B, a process of comparing the effective image area of the input analog video signal and the effective image area of the candidate format and a process of calculating an overlapping ratio of the effective image area of the input analog video signal and the effective image area of the candidate format will be described.

The control unit 101 calculates a horizontal overlapping period (corresponding to an overlapping ratio in the horizontal direction) in steps S601 through S609, calculates a vertical overlapping period (corresponding to an overlapping ratio in the vertical direction) in steps S610 through S618, and calculates an overlapping ratio in step S619.

Figure 8A:
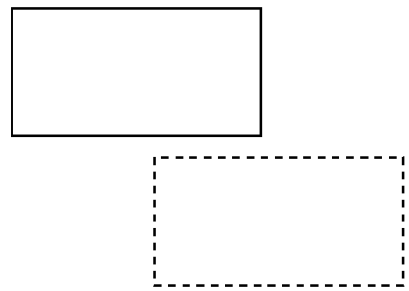
FIGS. 8A through 8D are illustrations for describing exemplary cases in which an effective image area of an input analog video signal and an effective image area of a candidate format are overlapped with each other.

In step S601, the control unit 101 determines whether a relationship between the effective image area of the input analog video signal and the effective image area of the candidate format corresponds to a case illustrated in FIG. 8A. Specifically, the control unit 101 determines whether either of TBL_hEnd<MEAS_hStart and TBL_hStart>MEAS_hEnd holds true. If either of the two conditions holds true (TRUE in step S601), in step S602, the control unit 101 determines that the horizontal overlapping period is 0. In a case illustrated in FIG. 8A, the effective image area of the input analog video signal and the effective image area of the candidate format are not overlapped with each other at all.

Figure 8B:
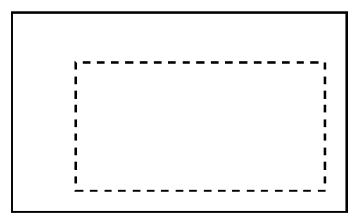

If the determination is FALSE in step S601, in step S603, the control unit 101 determines whether the relationship between the effective image area of the input analog video signal and the effective image area of the candidate format corresponds to a case illustrated in FIG. 8B. Specifically, the control unit 101 determines whether TBL_hEnd<MEAS_hStart and TBL_hStart>MEAS_hEnd both hold true. If the two conditions hold true (TRUE in step S603), in step S604, the control unit 101 determines the horizontal period MEAS_hResolTime of the effective image area measured in step S204 as the horizontal overlapping period. In a case illustrated in FIG. 8B, the horizontal range of the effective image area of the candidate format is included within the horizontal range of the effective image area of the input analog video signal.

Figure 8C:
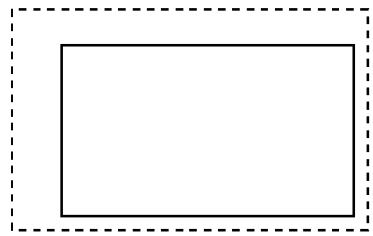

If the determination is FALSE in step S603, in step S605, the control unit 101 determines whether the relationship between the effective image area of the input analog video signal and the effective image area of the candidate format corresponds to a case illustrated in FIG. 8C. Specifically, the control unit 101 determines whether TBL_hEnd>MEAS_hStart and TBL_hStart<MEAS_hEnd both hold true. If the two conditions hold true (TRUE in step S605), in step S606, the control unit 101 determines the horizontal period TBL_hResolTime of the effective image area of the candidate format as the horizontal overlapping period. In a case illustrated in FIG. 8C, the horizontal range of the effective image area of the input analog video signal is included within the horizontal range of the effective image area of the candidate format.

Figure 8D:
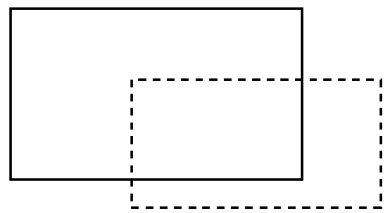

If the determination is FALSE in step S605, in step S607, the control unit 101 determines whether the relationship between the effective image area of the input analog video signal and the effective image area of the candidate format corresponds to a case illustrated in FIG. 8D. Specifically, the control unit 101 determines which one of TBL_hStart and MEAS_hStart is closer to the horizontal synchronization signal. If it is determined in step S607 that TBL_hStart<MEAS_hStart holds true (TRUE in step S607), in step S608, the control unit 101 determines the result obtained by subtracting MEAS_hStart from TBL_hEnd as the horizontal overlapping period. If it is determined in step S607 that TBL_hStart<MEAS_hStart does not hold true (FALSE in step S607), in step S609, the control unit 101 determines the result obtained by subtracting TBL_hStart from MEAS_hEnd as the horizontal overlapping period. In a case illustrated in FIG. 8D, the horizontal range of the effective image area of the candidate format and the horizontal range of the effective image area of the input analog video signal are partially overlapped with each other.

Through such determination and calculation, the control unit 101 can determine to which one of cases illustrated in FIGS. 8A through 8D the relationship between the effective image area measured in step S204 and the effective image area of the candidate format in the horizontal direction corresponds, and can thus determine the horizontal overlapping period corresponding to the overlapping ratio in the horizontal direction.

In step S610, the control unit 101 determines whether the relationship between the effective image area of the input analog video signal and the effective image area of the candidate format corresponds to a case illustrated in FIG. 8A. Specifically, the control unit 101 determines whether either of TBL_vEnd<MEAS_vStart and TBL_vStart>MEAS_vEnd holds true. If either of the two conditions holds true (TRUE in step S610), in step S611, the control unit 101 determines that the vertical overlapping period is 0.

If the determination is FALSE in step S610, in step S612, the control unit 101 determines whether the relationship between the effective image area of the input analog video signal and the effective image area of the candidate format corresponds to a case illustrated in FIG. 8B. Specifically, the control unit 101 determines whether TBL_vEnd<MEAS_vStart and TBL_vStart>MEAS_vEnd both hold true. If the two conditions hold true (TRUE in step S612), in step S613, the control unit 101 determines the vertical period (or a total number of lines) MEAS_vResol of the effective image area measured in step S204 as the vertical overlapping period.

If the determination is FALSE in step S612, in step S614, the control unit 101 determines whether the relationship between the effective image area of the input analog video signal and the effective image area of the candidate format corresponds to a case illustrated in FIG. 8C. Specifically, the control unit 101 determines whether TBL_vEnd>MEAS_vStart and TBL_vStart<MEAS_vEnd both hold true. If the two conditions hold true (TRUE in step S614), in step S615, the control unit 101 determines the vertical period (or a total number of lines) TBL_vResol of the effective image area of the candidate format as the vertical overlapping period.

If the determination is FALSE in step S614, in step S616, the control unit 101 determines whether the relationship between the effective image area of the input analog video signal and the effective image area of the candidate format corresponds to a case illustrated in FIG. 8D. Specifically, the control unit 101 determines which one of TBL_vStart and MEAS_vStart is closer to the vertical synchronization signal. If it is determined in step S616 that TBL_vStart<MEAS_vStart holds true (TRUE in step S616), in step S617, the control unit 101 determines the result obtained by subtracting MEAS_vStart from TBL_vEnd as the vertical overlapping period. If it is determined in step S616 that TBL_vStart<MEAS_vStart does not hold true (FALSE in step S616), in step S618, the control unit 101 determines the result obtained by subtracting TBL_vStart from MEAS_vEnd as the vertical overlapping period.

Through such determination and calculation, the control unit 101 can determine to which one of cases illustrated in FIGS. 8A through 8D the relationship between the effective image area measured in step S204 and the effective image area of the candidate format in the vertical direction corresponds, and can thus determine the vertical overlapping period corresponding to the overlapping ratio in the vertical direction.

In step S619, the control unit 101 calculates the overlapping ratio (%)=(horizontal overlapping period×vertical overlapping period/measured area)×100. Here, the measured area is calculated by multiplying the horizontal period of the effective image area measured in step S204 by the vertical period of the effective image area measured in step S204. The horizontal period of the effective image area measured in step S204 is calculated by subtracting the start time hStart from the end time hEnd. The vertical period of the effective image area measured in step S204 is calculated by subtracting the start line vStart from the end line vEnd.

The control unit 101 carries out the process indicated in step S206 (i.e., the process of calculating the overlapping ratio as indicated in FIGS. 6A and 6B) on all of the at least one candidate format found in step S203. Through this, the overlapping ratio of the effective image area of the input analog video signal and the effective image area of each of the at least one candidate format found in step S203 is calculated.

In step S207, the control unit 101 determines a candidate format having a maximum overlapping ratio as a format of the input analog video signal. When the overlapping ratios are calculated on the examples illustrated in FIG. 5B, an overlapping ratio of candidate format 1280×1024_B is 95.77%, an overlapping ratio of candidate format 1280× 1024_C is 99.21%, and an overlapping ratio of candidate format 1280×1024_E is 100%. As a result, the format or type of the input analog video signal is determined to be 1280× 1024_E.

The control unit 101 reads out the sampling clock frequency (refer to the column 314 in FIG. 3) specified for the format determined in step S207 from the RAM 134, and sets the sampling frequency in the A/D conversion unit 111. The A/D conversion unit 111 then converts the analog video signal from the analog input unit 110 to a digital signal at the sampling clock frequency set by the control unit 101. Through this, A/D conversion can be carried out while an occurrence of a missing view angle or the like is suppressed.

It is to be noted that, in a case in which there are two or more candidate formats whose overlapping ratio exceeds 100% while the determination is TRUE in step S605, a candidate format whose overlapping ratio is closer to 100% may be selected.

Although the image display period and the start position in the horizontal direction (specifically, the width of synchronization signal+the back porch period) have been used as information for defining the effective image area in the first exemplary embodiment, a different information may instead be employed. For example, the overlapping ratio may be calculated by using the front porch period.

Each of the functional blocks described in the first exemplary embodiment is not necessarily an individual hardware. In other words, the functions of some of the functional blocks, for example, may be implemented by a single hardware. In addition, the function of a single functional block or the functions of functional blocks may be implemented by a several pieces of hardware operating collaboratively. Furthermore, the function of each of the functional blocks may be implemented through a computer program which a central processing unit (CPU) has loaded on a memory.

Second Exemplary Embodiment

At least one of the various functions, processes, and methods described in the first exemplary embodiment can be achieved using a program. Hereinafter, in a second exemplary embodiment, a program for realizing at least one of the various functions, processes, and methods described in the first exemplary embodiment will be referred to as a "program X". Furthermore, in the second exemplary embodiment, a computer for executing the program X will be referred to as a "computer Y". Examples of the computer Y include a personal computer, a microcomputer, and a central processing unit (CPU).

At least one of the various functions, processes, and methods described in the first exemplary embodiment can be realized by the computer Y executing the program X. In this case, the program X is supplied to the computer Y via a computer readable storage medium. A computer readable storage medium according to the second exemplary embodiment includes at least one of a hard disk device, a magnetic storage device, an optical storage device, a magneto-optical storage device, a memory card, a read only memory (ROM), and a random access memory (RAM). Furthermore, the computer readable storage medium according to the second exemplary embodiment is a non-transitory storage medium.

While the present invention is described with reference to exemplary embodiments, it is to be understood that the present invention is not limited to the exemplary embodiments. The scope of the following claims is to be accorded the broadest interpretation so as to encompass all modifications and equivalent structures.

This application claims the benefit of Japanese Patent Application No. 2014-006271, filed Jan. 16, 2014, which is hereby incorporated by reference herein in its entirety.

What is claimed is:

1. A display apparatus comprising:
a measuring unit that measures an effective image area of an input analog video signal;
a determining unit that calculates an overlapping ratio of the measured effective image area and an effective image area of a candidate format using information relating to the measured effective image area and information relating to the effective image area of the candidate format, and determines whether or not the candidate format is a format of the input analog video signal using the calculated overlapping ratio of the candidate format and other overlapping ratios calculated from other candidate formats; and
a conversion unit that converts the input analog video signal to a digital signal using a sampling clock frequency specified by the candidate format, when the candidate format is determined as the format of the input analog video signal.

2. The display apparatus according to claim 1, wherein the information relating to the measured effective image area includes a start position and an end position of the effective image area of the input analog video signal in a horizontal direction, and a start position and an end position of the effective image area of the input analog video signal in a vertical direction.

3. The display apparatus according to claim 2, wherein the start position and the end position of the effective image area of the input analog video signal in the horizontal direction are calculated based on a time from a horizontal synchronization signal, and
wherein the start position and the end position of the effective image area of the input analog video signal in the vertical direction are calculated based on a total number of lines from a vertical synchronization signal.

4. A method comprising:
measuring an effective image area of an input analog video signal;
calculating an overlapping ratio of the measured effective image area and an effective image area of a candidate format using information relating to the measured effective image area and information relating to the effective image area of the candidate format;
determining whether or not the candidate format is a format of the input analog video signal using the calculated overlapping ratio of the candidate format and other overlapping ratios calculated from other candidate formats; and
converting the input analog video signal to a digital signal using a sampling clock frequency specified by the candidate format, when the candidate format is determined as the format of the input analog video signal.

5. The method according to claim 4, wherein the information relating to the measured effective image area includes a start position and an end position of the effective image area of the input analog video signal in a horizontal direction, and a start position and an end position of the effective image area of the input analog video signal in a vertical direction.

6. The method according to claim 5, wherein the start position and the end position of the effective image area of the input analog video signal in the horizontal direction are calculated based on a time from a horizontal synchronization signal, and
wherein the start position and the end position of the effective image area of the input analog video signal in the vertical direction are calculated based on a total number of lines from a vertical synchronization signal.

7. A non-transitory storage medium that stores a program causing a computer to execute a method, the method comprising:
measuring an effective image area of an input analog video signal;
calculating an overlapping ratio of the measured effective image area and an effective image area of a candidate format using information relating to the measured effective image area and information relating to the effective image area of the candidate format;
determining whether or not the candidate format is a format of the input analog video signal using the calculated overlapping ratio of the candidate format and other overlapping ratios calculated from other candidate formats; and
converting the input analog video signal to a digital signal using a sampling clock frequency specified by the candidate format, when the candidate format is determined as the format of the input analog video signal.

8. The display apparatus according to claim 1, wherein the candidate format is determined as the format of the input analog video signal when the candidate format has a maximum overlapping ratio.

9. The display apparatus according to claim 1, wherein the display apparatus includes a projector.

10. The method according to claim 4, wherein the candidate format is determined as the format of the input analog video signal when the candidate format has a maximum overlapping ratio.

11. The method according to claim 4, wherein the method is implemented in a projector.

* * * * *